United States Patent

[11] 3,572,772

[72] Inventor Karl A. Brandenberg
 Hayward, Calif.
[21] Appl. No. 794,334
[22] Filed Jan. 27, 1969
[45] Patented Mar. 30, 1971
[73] Assignee The Aro Corporation
 Bryan, Ohio

[54] TUBE CONNECTOR
 3 Claims, 3 Drawing Figs.
[52] U.S. Cl. .................................................. 285/213,
 285/242
[51] Int. Cl. ...................................................... F16l 41/00
[50] Field of Search............................................ 285/213,
 239, 242, 189, 158, 174, 414

[56] References Cited
UNITED STATES PATENTS
2,092,358 9/1937 Robertson.................... 285/213
3,336,055 8/1967 Poll et al....................... 285/158X
FOREIGN PATENTS
569,632 11/1957 Italy ............................. 285/242
626,546 10/1961 Italy ............................. 285/242

Primary Examiner—Dave W. Arola
Attorney—Molinare, Allegetti, Newitt & Witcoff

ABSTRACT: A barbed insert is fitted into the terminal end of a plastic tube. The tube and attached insert are then positioned through a hole in a plate. The insert is chamfered at one end to engage a counterbore opening in the plate and hold the plastic tube and attached insert in a fixed position in the plate.

PATENTED MAR 30 1971 3,572,772

INVENTOR
KARL A. BRANDENBERG by: Bair, Freeman & Molinare
ATTYS.

TUBE CONNECTOR

BACKGROUND OF THE INVENTION

This invention relates to an assembly for connecting plastic tubes of the type used for pneumatic circuits to a plate.

With the development of pneumatic control systems, for example, for industrial machine applications, pneumatic card and tape readers have been developed. Such devices require a relatively high number of pneumatic output and input conduits often confined in a small space.

Thus, one of the problems encountered when designing a reader head, for example, concerns the physical positioning and maintaining in position of the many pneumatic input tubes to the head. Known methods for retaining tubes by providing sleeves for fixing the tubes to the head prove to be too cumbersome and not compact enough to allow simple design and inexpensive construction.

The following characteristics are desired for a tube connector assembly that will be practical for such applications:
1. The distance between tubes must be minimized;
2. The tubes must be retained tightly so that they will not disconnect due to pressure or pulling;
3. The tubes must be sealed at both high (up to 150 p.s.i.g.) and low pressures; and
4. Finally, the separate tubes must be easily installed and likewise easily removable and replaceable.

SUMMARY OF THE INVENTION

In a principal aspect the present invention of a tube connector assembly for connecting a plastic tube to a plate comprises an insert having a barb thereon positioned in the end of the tube. The tube is then fitted through an opening in the plate. The insert in cooperation with the plate includes means which prevent the insert and attached tube from being pulled through the plate.

It is thus an object of the present invention to provide an improved tube connector assembly.

It is a further object of the present invention to provide a tube connector assembly which permits positioning the tubes very close together.

Still another object of the present invention is to provide a tube connector assembly which maintains a connection between the tube and plate over a wide range of pressures so that the tubes cannot be disconnected due to pressure or pulling easily be installed and removed.

One further object of the present invention is to provide a tube connector assembly constructed so that tubes may easily be installed and removed.

One further object of the present invention is to provide an inexpensive and relatively simple tube connector assembly.

These and other objects, advantages and features of the invention will be set forth in greater detail in the description which follows.

BRIEF DESCRIPTION OF THE DRAWINGS

In the detailed description which follows reference will be made to the drawings comprised of the following FIGS..

DESCRIPTION OF THE PREFERRED EMBODIMENTS

Figure 1:
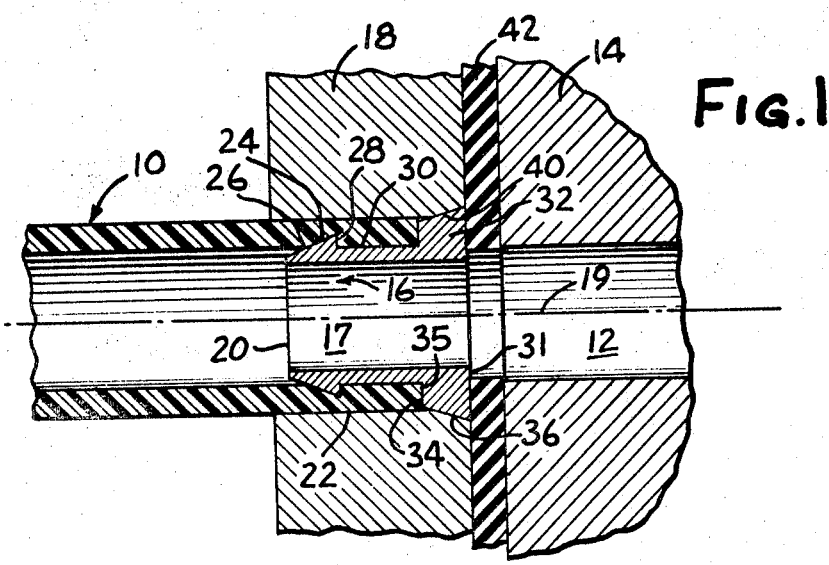
FIG. 1 is a cross-sectional view of a first embodiment of the improved tube connector assembly of the invention.
Figure 3:
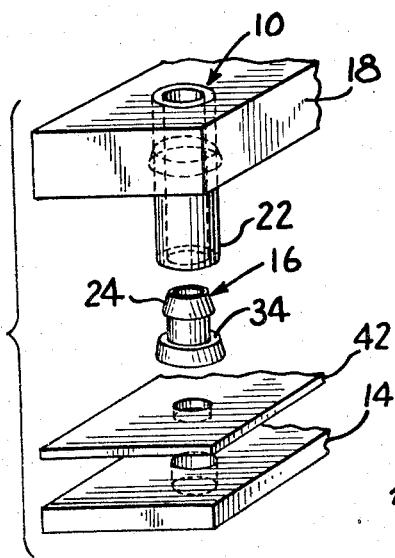
FIG. 3 is an exploded perspective view of the assembly shown in FIG. 1.

Referring first to FIGS. 1 and 3 there is shown a typical tube 10 of the type used for pneumatic control circuits. The tube 10 is generally of a plastic material such as polyethylene or rubber. Typically, it is desirable to position the tube 10 over an opening 12 in a body 14. The body 14 may be a reader head, for example.

The tube connector assembly includes a hollow insert 16 and a plate 18. The insert 16 and plate 18 are constructed to cooperate not only with each other, but also with the tube 10 so that the tube 10 and attached insert 16 may be easily positioned in a fixed, locked relationship through the plate 18.

The insert 16 includes a central passage 17 with an axis 19 and also includes a tube-receiving end 20 adapted to fit into a terminal end 22 of the tube 10. The tube-receiving end 20 includes a circumferential barb 24. The barb 24 is formed by the intersection of a radial surface 28 and an inclined or frustoconical surface 26. Thus, at the receiving end 20 of the insert 16 the surface 26 has a diameter less than the inside diameter of the tube 10; whereas, at the opposite end of the surface 26, the diameter is greater than the inside diameter of the tube 10 but less than the outside diameter of the tube 10. This latter described surface 26 diameter is approximately equal to the diameter of a surface of revolution halfway through the wall thickness of the tube 10.

The frustoconical surface 26 intersects the radial surface 28 to form the grasping portion of the barb 24. The radial surface 28 terminates at an outside cylindrical surface 30 of the insert 16. The outside surface 30 has a diameter substantially equal to the diameter of the inside of the tube 10. The opposite end 31 of the insert 16 is provided with a flange 32 defined by a second radial surface or neck surface 34 and a second cylindrical or chamfered surface 36. The neck surface 34 is adapted to engage the end surface 35 of the tube 10 thereby limiting the travel of the tube 10 inserted over the barb 24.

The second cylindrical surface 36 is chamfered or beveled outwardly from the intersection of the neck surface 34 and the surface 36. The line of intersection of the neck surface 34 and the surface 36 is substantially coincident with the outside cylindrical surface of the tube 10. The surface 36 forms an angle of about 10° with the outside cylindrical surface 30 of insert 16.

The plate 18 includes a cylindrical passage 38 having a diameter substantially equal to the outside diameter of the tube 10. Plate 18 also includes a counterbore passage 40 defined at one end of the cylindrical passage 38. The counterbore passage 40 is adapted to engage the chamfered surface 36 of the insert 16 thereby holding the insert 16 in a substantially fixed position in the plate 18 when the insert 16 is directed or pulled to the left. The insert 16 and attached tube 10 may be removed from the plate 18 by displacing the insert 16 and tube 10 to the right as shown in FIG. 1.

To assemble the configuration reference is made especially to FIG. 3. There the plastic tube 10 has been inserted through the plate 18. The barbed insert 16 is then inserted into the plastic tube 10 so that the terminal end 22 of the tube 10 engages the radial neck surface 34. The tube 10 and attached insert are pulled up through the plate 18. When being pulled through the plate 18, the barb 24 of the insert 16 deforms the plastic tube slightly and wedges the tube 10 in position within the plate 18. The tube 10 is deformed because the insert 16 is made of a material, preferably metal, which is relatively harder than the material from which the tube 10, generally plastic or rubber, is formed. The chamfered surface 36 engages the counterbore passage 40 to prevent the tube 10 and insert 16 from being pulled through the plate 18.

In practice, the plate 18 is provided with a plurality of tubes 10 attached in the manner just described. The plate 18 and attached tubes are then positioned, for example, against a body 14 as shown in FIGS. 1 and 3 with an intervening gasket 42 to provide a seal. The plate 18 is thus fastened to the body 14 through the gasket 42 thereby holding the assembly in a locked configuration. To remove or replace the tubes in the assembly, the plate 18 is disconnected from the body 14 and the assembly process is reversed.

Figure 2:
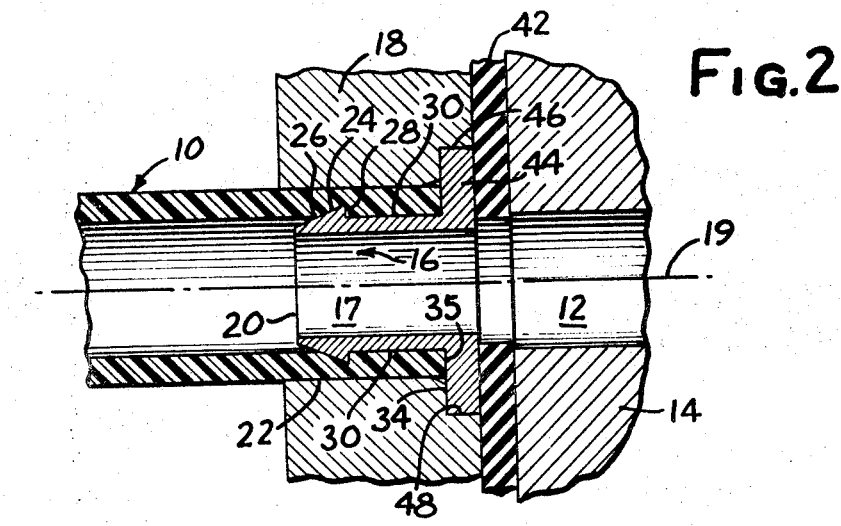
FIG. 2 is a cross-sectional view of a second preferred embodiment of the invention.

Referring now to FIG. 2 there is shown an alternative embodiment of the invention. The embodiment shown in FIG. 2 is numbered in the same manner as the embodiment of FIGS. 1 and 3 except where differences occur. In FIG. 2 the construction of the insert 16 is varied by providing a cylindrically-shaped flange 44. The flange 44 includes a nonchamfered cylindrical outer surface 46 which is concentric with the outside surface of the insert 16. The flange 44 mates with a corresponding counterbore opening 48 provided in the plate 18. Thus, where the embodiment described in FIG. 1 had a surface chamfered at 10° or thereabouts, the embodiment disclosed in FIG. 2 is provided with a nonchamfered flange 44.

I claim:

1. A tube connector assembly for grasping and connecting with the terminal end of a cylindrically-shaped plastic tube which, when assembled, comprises in combination:

a cylindrically-shaped hollow insert inserted into the terminal end of the plastic tube, said insert being fabricated from a material relatively harder than said plastic tube, said insert having at least one tube-receiving end, said tube-receiving end having an external diameter no greater than the inside diameter of said plastic tube when said assembly is in the unassembled condition, a barb defined on the outside surface of said insert adjacent said tube-receiving end, said barb extending radially outward to define an external diameter on said insert greater than the inside diameter of said tube in the unassembled condition, but less than the outside diameter of said tube in the unassembled condition, said barb deforming said tube upon insertion therein, said insert also including flange means at the end of said insert opposite said tube-receiving end, at least a portion of said flange means having a diameter greater than the outside diameter of said tube in the unassembled conditions; and a plate having an opening therethrough, said opening having a diameter substantially equal to the outside diameter of said tube in the unassembled condition, said opening receiving said tube with said insert positioned in the terminal end of said tube, said plate including means for cooperating with said insert flange means to prevent said insert and attached tube from passing completely through said opening thereby holding said tube and said insert in a fixed position in said plate.

2. The assembly of claim 1 wherein said flange means for holding said insert in position in said plate include a flange defined on said insert opposite said tube-receiving end, said flange also providing a stop for said tube fitted on said insert.

3. The assembly of claim 1 wherein said flange means comprises a chamfered flange, said chamfered flange having a neck surface mated with the terminal end surface of said tube, said flange flaring outwardly from said neck surface, said plate including a counterbore adapted to receive said chamfered flange.